(12) United States Patent
Matsuyama et al.

(10) Patent No.: US 11,008,170 B2
(45) Date of Patent: May 18, 2021

(54) PHARMACEUTICAL FORMULATION TRANSPORTING DEVICE AND PHARMACEUTICAL FORMULATION PRINTING DEVICE

(71) Applicant: QUALICAPS CO., LTD., Yamatokoriyama (JP)

(72) Inventors: Tomokazu Matsuyama, Yamatokoriyama (JP); Yoshihisa Konishi, Yamatokoriyama (JP); Kenji Fujita, Yamatokoriyama (JP); Motohiro Yagyu, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 0 days.

(21) Appl. No.: 16/347,325

(22) PCT Filed: Nov. 7, 2017

(86) PCT No.: PCT/JP2017/040075
§ 371 (c)(1),
(2) Date: May 3, 2019

(87) PCT Pub. No.: WO2018/100980
PCT Pub. Date: Jun. 7, 2018

(65) Prior Publication Data
US 2019/0276239 A1    Sep. 12, 2019

(30) Foreign Application Priority Data

Nov. 30, 2016  (JP) .............................. JP2016-232089
Jun. 23, 2017  (JP) .............................. JP2017-123252

(51) Int. Cl.
*B65G 15/14*    (2006.01)
*B41F 17/36*    (2006.01)
(Continued)

(52) U.S. Cl.
CPC .............. *B65G 15/14* (2013.01); *B41F 17/36* (2013.01); *B41J 3/407* (2013.01); *B65G 21/14* (2013.01);
(Continued)

(58) Field of Classification Search
CPC ... B41J 2/01; B41J 3/407; B41J 3/4073; B41J 3/60; B41J 11/04; B41J 25/001;
(Continued)

(56) References Cited

U.S. PATENT DOCUMENTS 5,423,252 A * 6/1995 Yamamoto .............. B41F 17/36
 101/35
5,596,865 A * 1/1997 Kramer ..................... A61J 3/10
 198/588

(Continued)

FOREIGN PATENT DOCUMENTS

CN    104812357 A    7/2015
CN    205240590 U    5/2016
(Continued)

OTHER PUBLICATIONS

The extended European search report of the corresponding EP application No. 178772455 dated Jul. 9, 2020.
(Continued)

*Primary Examiner* — Anh T Vo
(74) *Attorney, Agent, or Firm* — Muncy, Geissler, Olds & Lowe, P.C.

(57) ABSTRACT

Provided is a pharmaceutical formulation transporting device capable of easily ensuring a large exposed area of a solid pharmaceutical formulation during transport. A pharmaceutical formulation transporting device 10 comprises a first pulley 11, a second pulley 12, and a plurality of endless transport belts 13, 14 wound around the first pulley 11 and the second pulley 12, wherein the plurality of transport belts
(Continued)

13, 14 are disposed so as to be capable of holding a solid pharmaceutical formulation between respective first side surfaces.

19 Claims, 9 Drawing Sheets

(51) Int. Cl.
  *B41J 3/407* (2006.01)
  *B65H 5/02* (2006.01)
  *B65G 21/14* (2006.01)

(52) U.S. Cl.
  CPC ....... *B65H 5/023* (2013.01); *B65G 2201/027* (2013.01)

(58) Field of Classification Search
  CPC ........... B41J 2002/16502; B65G 15/14; B65G 21/14; B65G 21/16; B65G 21/2045; B65G 2201/027; B41F 17/36; B65H 5/023; B05C 5/00; B05C 11/10; B05C 13/02; B05D 1/26; B05D 3/00; B41M 5/0088; A61J 3/06; A61J 3/007; A61J 7/0092; A61J 9/06
  See application file for complete search history.

(56) References Cited

U.S. PATENT DOCUMENTS

| | | | |
|---|---|---|---|
| 9,108,431 B2* | 8/2015 | Hara | B41F 17/36 |
| 9,987,864 B2* | 6/2018 | Nakano | B41J 2/01 |
| 2014/0168309 A1* | 6/2014 | Morita | B41J 3/407 |
| | | | 347/16 |
| 2015/0191028 A1* | 7/2015 | Hara | B41J 3/60 |
| | | | 347/104 |
| 2018/0086059 A1* | 3/2018 | Ikuta | B41J 2/04586 |

FOREIGN PATENT DOCUMENTS

| | | |
|---|---|---|
| DE | 202012104467 U1 | 5/2013 |
| EP | 0351022 A1 | 1/1990 |
| GB | 1597177 A | 9/1981 |
| JP | S52121084 U | 9/1977 |
| JP | S61-204685 U | 12/1986 |
| JP | H11-51873 A | 2/1999 |
| JP | 2015-186783 A | 10/2015 |
| WO | 01/25127 A1 | 4/2001 |
| WO | 2018/019958 A1 | 2/2018 |

OTHER PUBLICATIONS

The office action of the corresponding CN application No. 201780073103.2 dated Jul. 21, 2020 and machine English translation thereof.

* cited by examiner

PHARMACEUTICAL FORMULATION TRANSPORTING DEVICE AND PHARMACEUTICAL FORMULATION PRINTING DEVICE

TECHNICAL FIELD

The present invention relates to a pharmaceutical formulation transporting device and a pharmaceutical formulation printing device.

BACKGROUND ART

As a mechanism for transporting solid pharmaceutical formulations such as tablets and capsules, for example, Patent Literature 1 discloses a configuration that includes two drums for retaining tablets on the circumferential surfaces by suction and is capable of delivering the tablets from one drum to the other drum. According to this configuration, it is possible to inspect the appearance of the front surface of the tablets during transportation of the tablets by one drum and inspect the appearance of the back surface of the tablets during transportation of the tablets by the other drum. Patent Literature 2 discloses an inkjet marking device having such a tablet transporting mechanism.

CITATION LIST

Patent Literature

Patent Literature 1: JP H11-51873A
Patent Literature 2: JP 2015-186783A

SUMMARY OF INVENTION

Technical Problem

In the above conventional transporting mechanism, the exposed portion of a tablet during transport is limited to one of the front surface and the back surface, and when the tablet is transferred from one drum to the other, the front surface or the back surface of the tablet may be brought into contact with a drum. Accordingly when this transport mechanism is applied to a device for printing on the front and back surfaces of a tablet, some of the ink applied to the tablet may be transferred to a drum, resulting in a printing failure. Moreover, when transporting tablets while accommodating them in drum pockets, the shape and size of the pockets need to match the shape and size of the tablets, and thus there is a problem in that it is difficult to manage transporting various tablets.

Accordingly, an object of the present invention is to provide a pharmaceutical formulation transporting device capable of easily ensuring a large exposed area of a solid pharmaceutical formulation that is being transported and, moreover, another object is to provide a pharmaceutical formulation printing device that performs printing with a high degree of freedom on pharmaceutical formulations by using the pharmaceutical formulation transporting device.

Solution to Problem

The objects of the present invention are achieved by a pharmaceutical formulation transporting device comprising a first pulley, a second pulley, and a plurality of endless transport belts wound around the first pulley and the second pulley, wherein the plurality of transport belts are disposed so as to be capable of holding a solid pharmaceutical formulation between respective first side surfaces.

In this pharmaceutical formulation transporting device, it is preferable that at least either of the first pulley and the second pulley has a space for accommodating the held solid pharmaceutical formulation between a plurality of supporting parts around which the plurality of transport belts are respectively wound. Moreover, it is preferable that the pharmaceutical formulation transporting device comprises retaining parts, wherein the retaining parts are connected to the supporting parts and retain second side surfaces of the transport belts.

It is preferable that the pharmaceutical formulation transporting device further comprises guiding means, wherein the guiding means are disposed between the first pulley and the second pulley and guide the transport belts. The pharmaceutical formulation transporting device can be configured such that the guiding means comprise guiding members having notched channels and a first sliding belt and a second sliding belt for sliding along the bottom surfaces and side surfaces of the respective channels, and the transport belts are thus in contact with the first sliding belt and the second sliding belt and integrally transported.

The pharmaceutical formulation transporting device can comprise a feeding means for feeding the solid pharmaceutical formulation to a space between the plurality of transport belts, and a gap adjusting member for increasing a gap between the transport belts on the further upstream side in a transporting direction of the transport belts than a place where the solid pharmaceutical formulation is fed by the feeding means. It is preferable that the gap adjusting member comprises a tension pulley for applying tension to the transport belts. The gap adjusting member can act for gap adjustment on both of the transport belts for holding the solid pharmaceutical formulation, or can act for gap adjustment on only one of the transport belts for holding the solid pharmaceutical formulation. Moreover, the pharmaceutical formulation transporting device can be configured such that the gap between the transport belts in a solid pharmaceutical formulation holding state is variable within a predetermined range, and the feeding means comprises a conveyor belt for transporting the solid pharmaceutical formulation. In this configuration, it is preferable that the width of the conveyor belt is smaller than the minimum gap between the transport belts, or the width of the conveyor belt is larger than the maximum gap between the transport belts.

Moreover, the above objects of the present invention are achieved by a pharmaceutical formulation printing device comprising the above pharmaceutical formulation transporting device and a plurality of printers for respectively printing on a front and back of a solid pharmaceutical formulation transported by the plurality of transport belts of the pharmaceutical formulation transporting device.

The pharmaceutical formulation printing device can further comprise a plurality of pre-printing inspecting devices for inspecting the front and back of the solid pharmaceutical formulation before printing. It is preferable that the plurality of pre-printing inspecting devices are disposed on the upstream side of any of the plurality of printers in a transporting direction.

The plurality of transport belts can be configured to be wound around a plurality of pulleys including the first pulley and the second pulley. It is preferable that the plurality of printers are each disposed so as to print on the solid pharmaceutical formulation transported between any two adjacent pulleys. Alternatively the plurality of printers are preferably each disposed so as to perform printing during transportation of the solid pharmaceutical formulation by any of the plurality of pulleys. The pharmaceutical formulation printing device may be configured to comprise the above pharmaceutical formulation transporting device and a printer for printing on a solid pharmaceutical formulation transported by the plurality of transport belts of the pharmaceutical formulation transporting device, wherein the printer is disposed so as to be capable of printing on the solid pharmaceutical formulation through a gap between the plurality of transport belts.

Advantageous Effects of Invention

According to the present invention, a pharmaceutical formulation transporting device can be provided that is capable of easily ensuring a large exposed area of a solid pharmaceutical formulation that is being transported.

Moreover, according to the present invention, a pharmaceutical formulation printing device can be provided that performs printing with a high degree of freedom on pharmaceutical formulations by using the pharmaceutical formulation transporting device.

DESCRIPTION OF EMBODIMENTS

Figure 1:
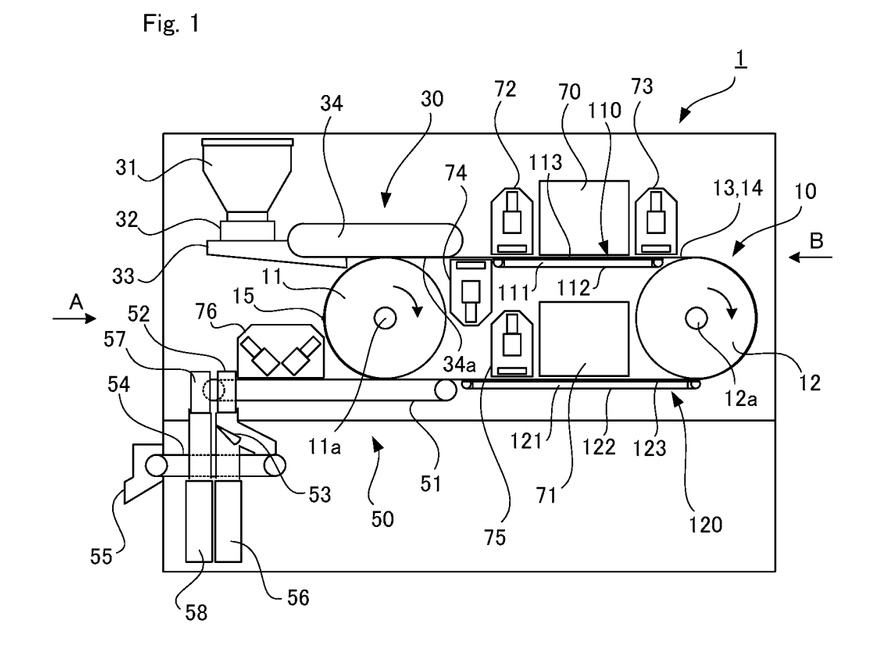
FIG. 1 is a schematic front view of a pharmaceutical formulation printing device including a pharmaceutical formulation transporting device according to one embodiment of the present invention.

Below, embodiments of the present invention will now be described with reference to the attached drawings. FIG. 1 is a schematic front view of a pharmaceutical formulation printing device according to one embodiment of the present invention. A pharmaceutical formulation printing device 1 includes a pharmaceutical formulation transporting device 10 for transporting pharmaceutical formulations, a feeding device 30 for feeding the pharmaceutical formulations to the pharmaceutical formulation transporting device 10, printers 70, 71 for printing on the pharmaceutical formulations during transport by the pharmaceutical formulation transporting device 10, and an ejector 50 for ejecting the pharmaceutical formulations transported by the pharmaceutical formulation transporting device 10 as main components.

The pharmaceutical formulation transporting device 10 includes a first pulley 11, a second pulley 12, and two endless transport belts 13, 14 wound around the first pulley 11 and the second pulley 12, and is capable of rotating the first pulley 11 in the direction indicated by the arrow by a drive motor (not shown) to move the transport belts 13, 14. As shown in the plan view of FIG. 2, the transport belts 13, 14 are disposed such that their linear portions are parallel to each other, and a gap is formed therebetween for holding solid pharmaceutical formulations such as tablets and capsules.

Figure 2:
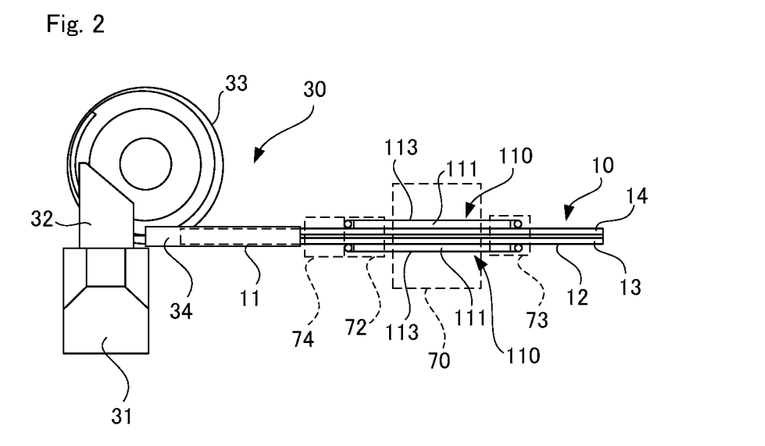
FIG. 2 is a plan view of the pharmaceutical formulation transporting device shown in FIG. 1.

The transport belts 13, 14 in the present embodiment are flat belts to suppress vibrations resulting from contact with the first pulley 11 and the second pulley 12 and to reliably hold solid pharmaceutical formulations. The transport belts 13, 14 may be V-belts, toothed belts, or the like. The material of the transport belts 13, 14 is preferably a soft material such as silicone rubber, silicone sponge, or urethane sponge to prevent damage to the held solid pharmaceutical formulations. Three or more transport belts may be provided to hold solid pharmaceutical formulations between the corresponding belts.

Figure 3:
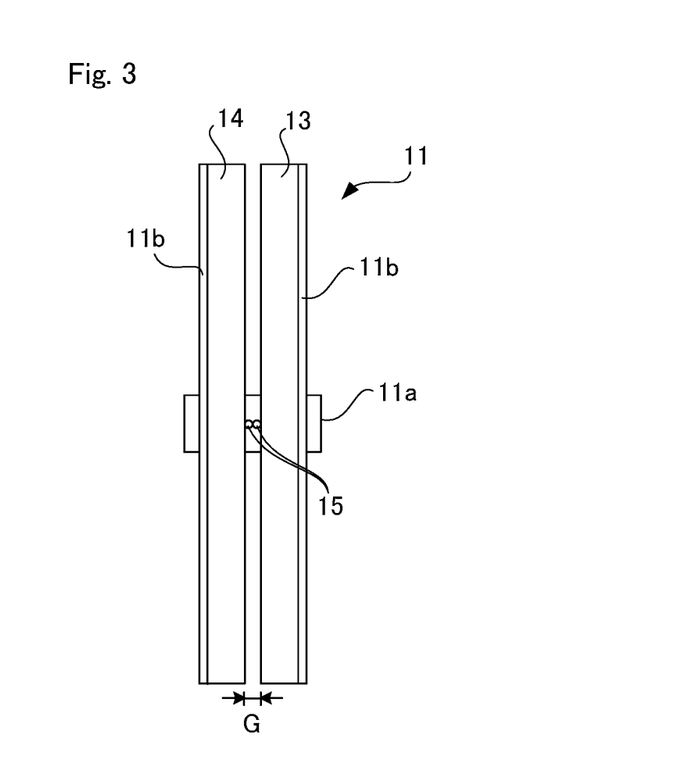
FIG. 3 is a side view showing a principal part of the pharmaceutical formulation transporting device shown in FIG. 1.

FIG. 3 is a side view of the first pulley 11 of FIG. 1 as viewed in the direction of arrow A. The transport belts 13, 14 are both wound in the circumferential direction of the first pulley 11 and disposed so as to be adjacent along a rotational shaft 11a, and a gap G therebetween has a gap adjusting member 15. The gap adjusting member 15 is composed of a pair of gap-increasing rollers rotatably supported by a bracket (not shown) and disposed at substantially the same height as the rotational shaft 11a to increase the gap G between the passing transport belts 13, 14. The gap adjusting member 15 is disposed on the further upstream side in the transporting direction than the place where solid pharmaceutical formulations are fed by the feeding means 30 that will be described below. Flange-like retaining parts 11b, 11b are formed on the respective sides in the axial direction of the first pulley 11, and the outer side surfaces of the transport belts 13, 14 are retained by the retaining parts 11b, 11b, respectively. The gap adjusting member 15 may be a fixed wedge-shaped component or the like other than the gap-up rollers.

Figure 4:
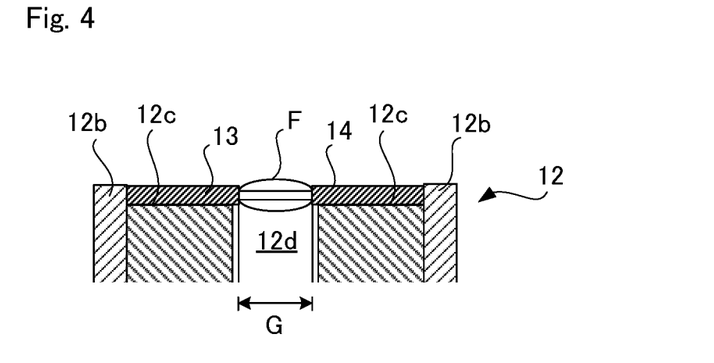
FIG. 4 is a cross-sectional view showing another principal part of the pharmaceutical formulation transporting device shown in FIG. 1.

FIG. 4 is a cross-sectional view of a principal part of the second pulley 12 of FIG. 1 as viewed in the direction of arrow B. The second pulley 12 has the same configuration as the first pulley 11, and flange-like retaining parts 12b, 12b for respectively retaining the outer side surfaces of the transport belts 13, 14 are provided on the respective sides in the axial direction. The second pulley 12 has two supporting parts 12c, 12c around which the transport belts 13, 14 are respectively wound, and a space 12d for accommodating a solid pharmaceutical formulation F held between the transport belts 13, 14 is formed between the supporting parts 12c, 12c. In order to reliably hold the solid pharmaceutical formulation F between the transport belts 13, 14, it is preferable that the inner sides of the transport belts 13, 14 project slightly more inward than the supporting parts 12c, 12c. Also, it is preferable that the places where the supporting parts 12c, 12c are fixed along the rotational axis are adjustable such that the size of the gap G between the transport belts 13, 14 can be adjusted according to the shape and the size of the solid pharmaceutical formulation F. It is preferable to set the size of the gap G to be slightly smaller than the length of the solid pharmaceutical formulation F in the holding direction such that the solid pharmaceutical formulation can be reliably held by the elastic force of the transport belts 13, 14. While the side surfaces of the transport belts 13, 14 that are brought into contact with the solid pharmaceutical formulation are flat in the present embodiment, the side surfaces may have irregularities.

Figure 5:
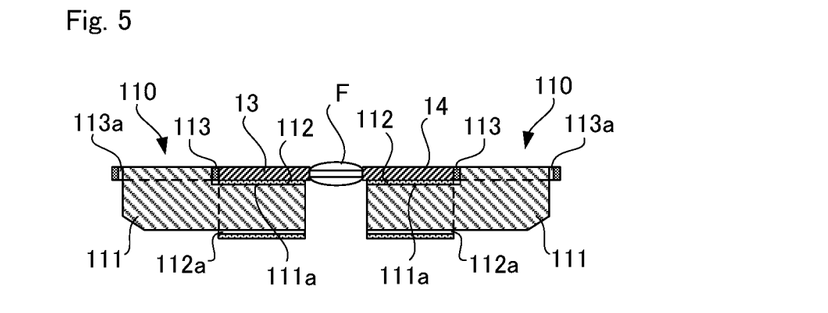
FIG. 5 is a cross-sectional view showing yet another principal part of the pharmaceutical formulation transporting device shown in FIG. 1.

As shown in FIG. 1, the pharmaceutical formulation transporting device 10 further includes two guiding devices 110, 120 disposed between the first pulley 11 and the second pulley 12 to guide the transport belts 13, 14. FIG. 5 is a cross-sectional view of the guiding device 110 of FIG. 1 as viewed in the direction of arrow B. As shown in FIG. 5, the guiding device 110 includes two block-like guiding members 111 corresponding to the two transport belts 13, 14, respectively. The two guiding members 111 are spaced apart from each other, and notched channels 111a are formed in the upper parts of the respective opposing surfaces.

The guiding device 110 further includes a first sliding belt 112 and a second sliding belt 113 disposed to be slidable over the respective guiding members 111. The first sliding belt 112 and the second sliding belt 113 are formed as endless belts, and wound around a plurality of pulleys 112a and 113a so as to slide along the bottom surfaces and the side surfaces of the respective channels 111a. The first sliding belt 112 and the second sliding belt 113 are in contact with the lower surfaces and the outer surfaces of the transport belts 13, 14, respectively and driven to travel in the same direction as the transporting direction of the transport belts 13, 14. In order to reduce friction between the inner surfaces of the channels 111a and the transport belts 13, 14, it is preferable that the guiding members 111 are formed of a highly slippery resin material or the like, or a coating is applied to the inner surfaces of the channels 111a. The guiding device 120 also has the same configuration as the guiding device 110 and includes two guiding members 121 and a first sliding belt 122 and a second sliding belt 123 disposed to be slidable over the respective guiding members 121. In order to be capable of reliably transporting the transport belts 13, 14 that are in contact, the first sliding belt 112 and the second sliding belt 113 are preferably timing belts or the like, and it is thus possible to suppress a speed change caused by slippage of the transport belts 13, 14 when the transport belts 13, 14 are flat belts.

As shown in FIG. 1, the feeding device 30 includes a hopper 31 into which solid pharmaceutical formulations are introduced, a constant-quantity feeding unit 32 composed of a linear feeder or the like for feeding a constant quantity of the solid pharmaceutical formulations fed from the hopper 31, an aligning unit 33 composed of a bowl feeder, a turn table, or the like for aligning the solid pharmaceutical formulations fed from the constant-quantity feeding unit 32, and a suction conveyor 34 for transporting the solid pharmaceutical formulations to the pharmaceutical formulation transporting device 10 by vacuum-sucking the solid pharmaceutical formulations aligned by the aligning unit 33 from above via the suction holes of a conveyor belt 34a. The transporting speed of the suction conveyor 34 can be set to be substantially the same as the transporting speed of the transport belts 13, 14.

Figure 6:
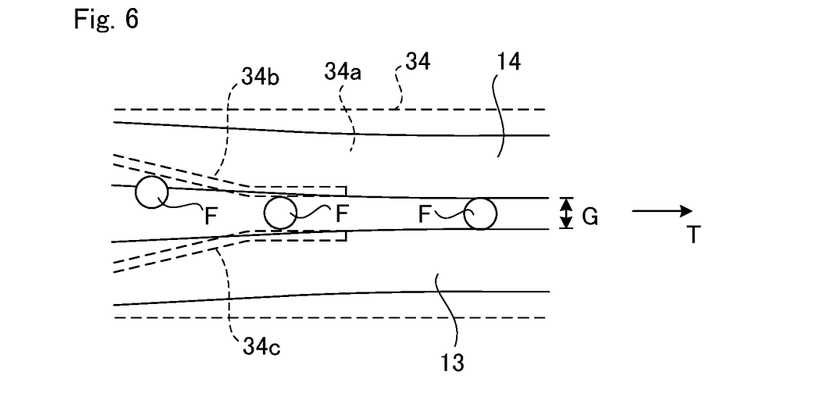
FIG. 6 is a plan view showing yet another principal part of the pharmaceutical formulation transporting device shown in FIG. 1.

As shown in the plan view of FIG. 6, the solid pharmaceutical formulations F held from above and transported by the suction conveyor 34 are moved along the surface (the lower surface) of the conveyor belt 34a and positionally adjusted by a pair of centering guides 34b, 34c, and then guided into the gap G between the transport belts 13, 14 from above. The gap G gradually narrows in the transporting direction T by the gap adjusting member 15 (see FIG. 1), and therefore the solid pharmaceutical formulations F sucked onto the suction conveyor 34 are held between the transport belts 13, 14 as the solid pharmaceutical formulations are transported, and are successively transferred to the pharmaceutical formulation transporting device 10. In order for the suction conveyor 34 to be capable of reliably performing transfer to the pharmaceutical formulation transporting device 10 even when the solid pharmaceutical formulations have different heights (thicknesses), it is preferable that the suction conveyor 34 is supported such that the vertical position is adjustable.

The printers 70, 71 are, for example, inkjet printers and are disposed above the transport belts 13, 14 respectively on the further upstream side and downstream side of the second pulley 12 in the transporting direction. Accordingly when the solid pharmaceutical formulations F to be transported are tablets, both the front and back surfaces of the tablets can be printed on. A pre-printing inspecting device 72 for, for example, inspecting the appearance and detecting the features of the solid pharmaceutical formulations (such as the score angle of tablets) and a print inspecting device 73 for, for example, inspecting the print after printing are disposed on the respective sides of one printer 70 in the transporting direction. Also, a pre-printing inspecting device 74 and a print inspecting device 75 are disposed on the respective sides of the other printer 71 in the transporting direction. Other than the inkjet printers, the printers 70, 71 may be, for example, laser printers, and, in this case, the printers can be disposed so as to print, from below, on the solid pharmaceutical formulations that are being transported. The two pre-printing inspecting devices 72, 74 for inspecting the front and back surfaces of the solid pharmaceutical formulations F before printing are preferably disposed on the upstream side of both two printers 70, 71 in the transporting direction as in the present embodiment and in the embodiments that will be described below. Accordingly, no matter if features such as the scores of the solid pharmaceutical formulations F are on either the front or back surface, letters, symbols and the like can be printed onto the front or back surface of the solid pharmaceutical formulations F according to the orientation of the features.

The ejector 50 includes an ejector conveyor 51 for transporting the solid pharmaceutical formulations transferred from the pharmaceutical formulation transporting device 10, a sorter 52 for sorting out good products from the solid pharmaceutical formulations transported by the ejector conveyor 51, a good-product conveyor 54 for guiding good solid pharmaceutical formulations via a damper 53, and an ejection chute 55 for ejecting good solid pharmaceutical formulations transported by the good-product conveyor 54. A side-surface inspecting device 76 for inspecting the side surface other than the front and back surfaces when the solid pharmaceutical formulations are tablets are provided above the ejector conveyor 51.

The sorter 52 determines whether the transported solid pharmaceutical formulations are good products or not based on the inspections by the pre-printing inspecting devices 72, 74, the print inspecting devices 73, 75, and the side-surface inspecting device 76, and feeds solid pharmaceutical formulations determined as good products to the good-product conveyor 54 by blowing air. The damper 53 can be switched so as to feed to an external box 56 the solid pharmaceutical formulations fed from the sorter 52. The ejector 50 further includes a defective-product ejection chute 57 for ejecting defective products among the solid pharmaceutical formulations that have passed through the sorter 52 to a defective-product box 58.

According to the pharmaceutical formulation printing device 1 having the above configuration, the solid pharmaceutical formulations F introduced into the hopper 31 of the feeding device 30 are transferred to the pharmaceutical formulation transporting device 10 and transported, the solid pharmaceutical formulations are printed on and inspected during transport by the pharmaceutical formulation transporting device 10 and then transferred to the ejector 50, and thus only the good products can be recovered. The pharmaceutical formulation transporting device 10 maintains by means of the transport belts 13, 14, a constantly held position of the solid pharmaceutical formulation F that is being transported, and therefore can ensure a large exposed area other than the held position of the solid pharmaceutical formulation. Accordingly, it is easy to print on a desired portion of the solid pharmaceutical formulation, there are little layout limitations of the printers 70, 71 with respect to the pharmaceutical formulation transporting device 10, and therefore printing can be performed with a high degree of freedom on the solid pharmaceutical formulation F.

Since the second pulley 12 has the space 12*d* between the two supporting parts 12*c*, 12*c*, the exposed portion of the solid pharmaceutical formulation F is unlikely brought into contact with the second pulley 12 even when the solid pharmaceutical formulation F held between the transport belts 13, 14 passes through the second pulley 12. Accordingly the orientation of the solid pharmaceutical formulation F can be changed while maintaining a large exposed area of the solid pharmaceutical formulation F, and printing can be performed with a high degree of freedom on the solid pharmaceutical formulation F. Moreover, since the second pulley 12 has the retaining parts 12*b*, the transport belts 13, 14 are reliably prevented from shifting outward or meandering, thus the gap G between the transport belts 13, 14 can be maintained in a constant manner, and the solid pharmaceutical formulation F can be reliably transported.

The layout of the transport belts 13, 14 is not limited to that of the present embodiment, and can be variously changed according to the purpose. For example, when printing on the front and back surfaces of tablets, the front and back surfaces of the tablets can be simultaneously printed on by disposing the transport belts such that tablets with the front surface side being exposed and tablets with the back surface side being exposed are parallelly transported in an adjacent state. Also, when a time to dry the ink is required after printing, such a time can be easily secured by extending the lengths of the transport belts 13, 14 to increase the transport distance.

Moreover, since the guiding devices 110, 120 are disposed between the first pulley 11 and the second pulley 12 so as to guide the transport belts 13, 14, the meandering, vertical movement, sagging, and the like of the transport belts 13, 14 due to gravity are prevented, and thus the solid pharmaceutical formulations F can be reliably transported by the transport belts 13, 14. The guiding devices 110, 120 includes the first sliding belts 112, 122 and the second sliding belts 113, 123 that slide on the guiding members 111, 121, therefore the transport belts 13, 14 can be moved integrally with the first sliding belts 112, 122 and the second sliding belts 113, 123, and the straight-line stability of the transport belts 13, 14 can be enhanced. On the other hand, the guiding devices 110, 120 may be configured so as not to include the first sliding belts 112, 122 and the second sliding belts 113, 123 such that the transport belts 13, 14 directly slide on the guiding members 111, 121. Moreover, the pharmaceutical formulation printing device 1 may be configured so as not to include the guiding devices 110, 120 when the interval between the first pulley 11 and the second pulley 12 is small, when the rigidity of the transport belts 13, 14 is high, or the like.

The position of a tablet held by the transport belts 13, 14 is not necessarily limited to the side surface, and, for example, the tablet may be held such that the front and back surfaces are held to cause the tablet to stand upright, and half of the circumferential part of the tablet side surface is exposed on either side of the transport belts 13, 14. Also, other than tablets, the transport belts 13, 14 can hold and transport capsules, and the position of a capsule to be held can be suitably determined according to the portion of the capsule to be printed on.

Figure 8:
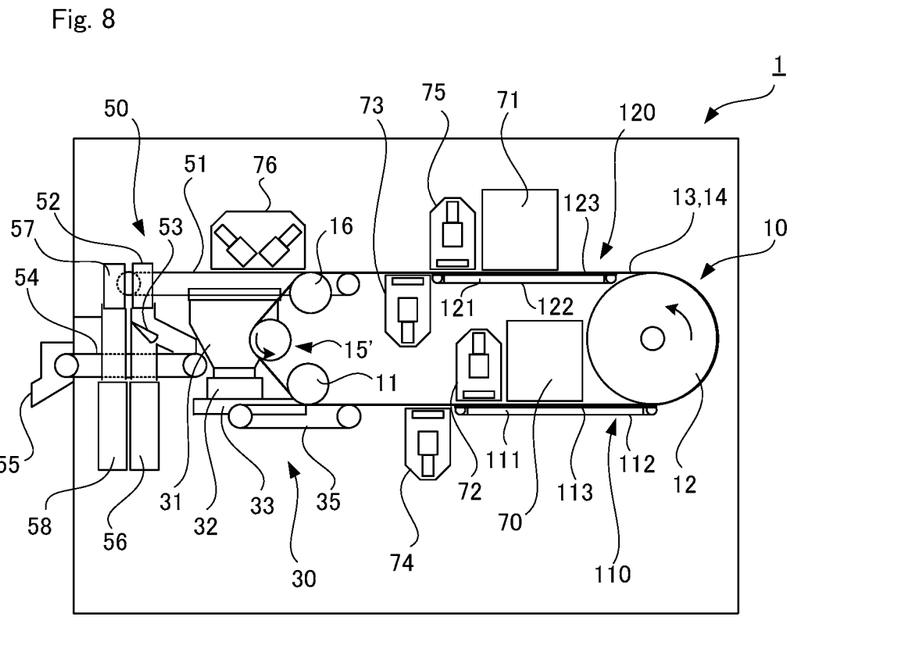
FIG. 8 is a schematic front view of a pharmaceutical formulation printing device including a pharmaceutical formulation transporting device according to another embodiment of the present invention.

The pharmaceutical formulation printing device 1 of the present embodiment is configured such that the solid pharmaceutical formulations fed from the feeding device 30 to the pharmaceutical formulation transporting device 10 are guided downward by the second pulley 12 and transported to the ejector 50, but as shown in FIG. 8, the pharmaceutical formulation printing device 1 may be configured such that the solid pharmaceutical formulations fed from the feeding device 30 to the pharmaceutical formulation transporting device 10 are guided upward by the second pulley 12 and transported to the ejector 50. In the pharmaceutical formulation printing device 1 shown in FIG. 8, components having the same functions as the components of the pharmaceutical formulation printing device 1 shown in FIG. 1 are given the same reference numbers (the same applies to the following drawings). The pharmaceutical formulation printing device 1 shown in FIG. 8 has a simplified configuration wherein the feeding device 30 includes a transport conveyor 35 having a conveyor belt that carriers solid pharmaceutical formulations on the transport surface and feeds them to the pharmaceutical formulation transporting device 10 in place of the suction conveyor 34 of the feeding device 30 shown in FIG. 1. The pharmaceutical formulation transporting device 10 includes a third pulley 16 in addition to the first pulley 11 and the second pulley 12, and the transport belts 13, 14 are wound around these pulleys. Moreover, the pharmaceutical formulation transporting device 10 includes a gap adjusting member 15' composed of a tension pulley for applying tension to the transport belts 13, 14. The number of pulleys other than the first pulley 11 and the second pulley 12 provided in the pharmaceutical formulation transporting device 10 is not particularly limited, and can be suitably changed according to the transport layout.

Figure 9:
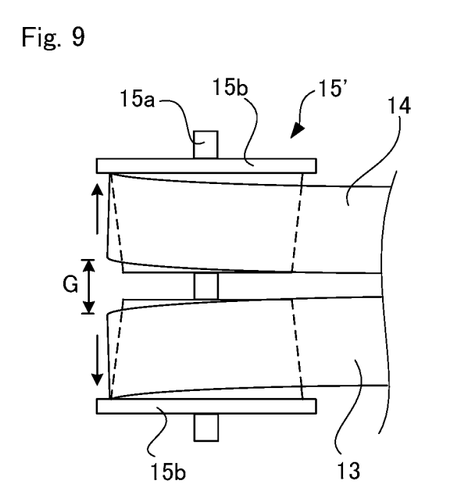
FIG. 9 is a plan view of a principal part of the pharmaceutical formulation transporting device shown in FIG. 8.

As shown in the plan view of FIG. 9, the gap adjusting member 15' is formed such that the diameter is increased from the center towards flanges 15b on the respective sides in the axial direction of a rotational shaft 15a in a tapered manner. As the gap adjusting member 15' is rotated, force toward the opposite sides in the axial direction as indicated by the arrows acts on the transport belts 13, 14 wound around the gap adjusting member 15, and therefore the gap G therebetween can be increased on the upstream side in the transporting direction of the feeding device 30. While the transport belts 13, 14 shown in FIG. 9 are supported by one rotational shaft 15a, the rotational shaft 15a may be divided to apply tension individually to each transport belt 13, 14.

Figure 10:
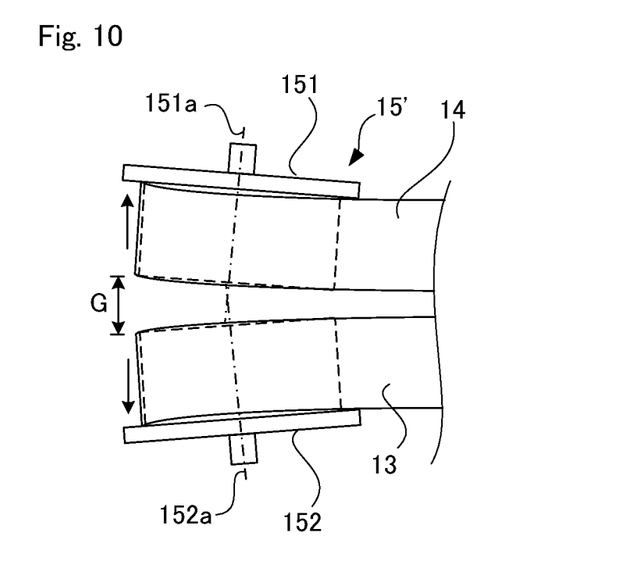
FIG. 10 is a plan view showing a modified example of a principal part of the pharmaceutical formulation transporting device shown in FIG. 8.

As shown in the plan view of FIG. 10, the gap adjusting member 15' may be configured to include a pair of tension pulleys 151, 152 disposed such that their respective axes 151a, 152a intersect with each other, and thereby it is also possible to increase the gap G between the transport belts 13, 14. Also, as shown in the plan view of FIG. 11, the gap adjusting member 15' may be configured to include a cylindrical tension pulley 153 having a space 153b in the central part of the rotational shaft 153a and gap-up rollers 154 provided in the space 153b. The gap-up rollers 154 are rotatably supported by a bracket (not shown) such that a rotational shaft 154a is parallel to the rotational shaft 153a of the tension pulley 153, and thus the gap between the transport belts 13, 14 can be increased.

In the above-described pharmaceutical formulation printing devices 1 configured such that the transport belts 13, 14 are wound around a plurality of pulleys including the first pulley 11 and the second pulley 12, a plurality of printers 70, 71 are each disposed so as to print on solid pharmaceutical formulations transported between any two adjacent pulleys, thereby both surfaces of the solid pharmaceutical formulations can be printed on, and printing can be performed more liberally. Moreover, by increasing the intervals between two adjacent pulleys to dispose a large number of printers, it is possible to perform, for example, multicolor printing, and individual needs can be easily addressed.

Figure 12:
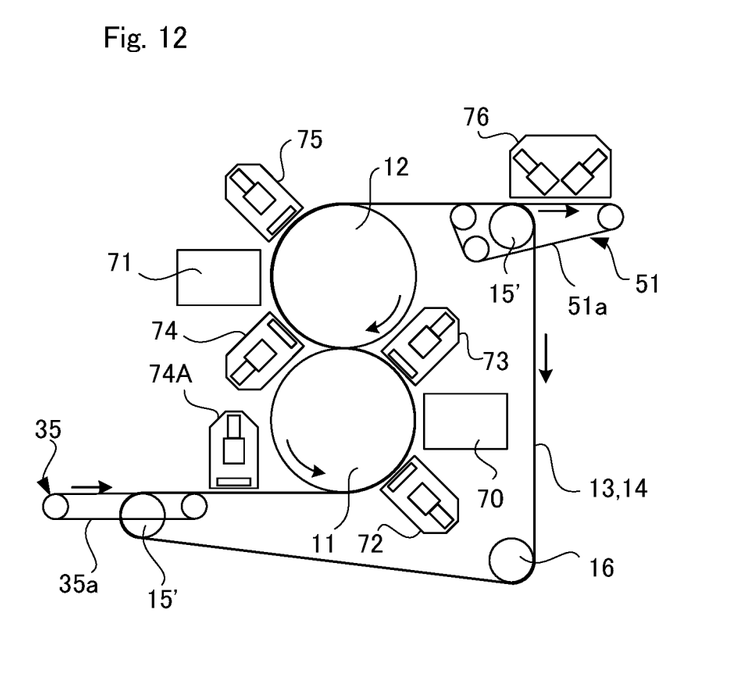
FIG. 12 is a schematic front view of a pharmaceutical formulation printing device including a pharmaceutical formulation transporting device according to another embodiment of the present invention.

On the other hand, as shown in FIG. 12, it is also possible to dispose the printers 70, 71 so as to perform printing during transportation of solid pharmaceutical formulations by any of the plurality of pulleys. In the pharmaceutical formulation printing device 1 shown in FIG. 12, the printers 70, 71 are respectively disposed such that printing is performed during transportation of solid pharmaceutical formulations by the first pulley 11 and the second pulley 12. For example, in the second pulley 12, the transport belts 13, 14 are respectively wound around the two supporting parts 12c, 12c of the second pulley 12 as shown in FIG. 4, and thereby stable transportation of solid pharmaceutical formulations is performed. In such a state, solid pharmaceutical formulations can be printed on with increased printing accuracy. Also, disposing the pre-printing inspecting devices 72, 74 and the print inspecting devices 73, 75 so as to inspect the solid pharmaceutical formulations during transportation of the solid pharmaceutical formulations by the first pulley 11 and the second pulley 12 can provide increased inspection accuracy. Concerning the configuration shown in FIG. 12, further disposing a pre-printing inspecting device 74A on the upstream side of the first pulley 11 in the transporting direction makes it possible to detect the features, such as scores, of the solid pharmaceutical formulations before printing by the printers 70, 71. It is also possible to provide only one of the two pre-printing inspecting devices 74, 74A.

Figure 13:
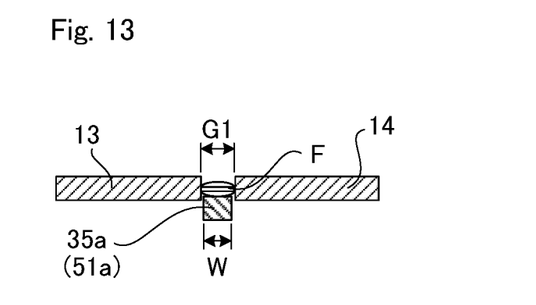
FIG. 13 is a cross-sectional view showing a principal part of the pharmaceutical formulation transporting device shown in FIG. 12.

A conveyor belt 35a of the transport conveyor 35 included in the feeding device feeds solid pharmaceutical formulations to the gap between the transport belts 13, 14, which is increased by the gap adjusting member 15'. The gap between the transport belts 13, 14 in a solid pharmaceutical formulation holding state is configured to be variable within a predetermined range so as to accommodate the shape and the size of various solid pharmaceutical formulations, and as shown in FIG. 13, a width W of the conveyor belt 35a is set to be smaller than a minimum gap G1 that is at the smallest value of the gap. According to this configuration, even when the thickness of the solid pharmaceutical formulation F is smaller than the thicknesses of the transport belts 13, 14, adjusting the height of the conveyor belt 35a such that the upper part of the conveyor belt 35a is inserted into the gap between the transport belts 13, 14 makes it possible to always hold the solid pharmaceutical formulation F at the center in the thickness direction of the transport belts 13, 14, and therefore transportation of the solid pharmaceutical formulation F by the conveyor belts 13, 14 can be reliably performed. Moreover, according to this configuration, the transport conveyor 35 can be disposed such that the conveyor belt 35a passes through the space formed in the central part in the axial direction of the gap adjusting member 15' shown in FIG. 9 to FIG. 11, and thus increased layout freedom can be provided. As with the conveyor belt 35a, a conveyor belt 51a of the ejection conveyor 51 included in the ejector can be formed to have a width W that is smaller than the smallest gap G1 between the transport belts 13, 14. The space between the transport belts 13, 14 is increased by the gap adjusting member 15', thus the state of the solid pharmaceutical formulations held by the transport belts 13, 14 is canceled, and the solid pharmaceutical formulations are transported by the conveyor belt 51a.

Figure 14:
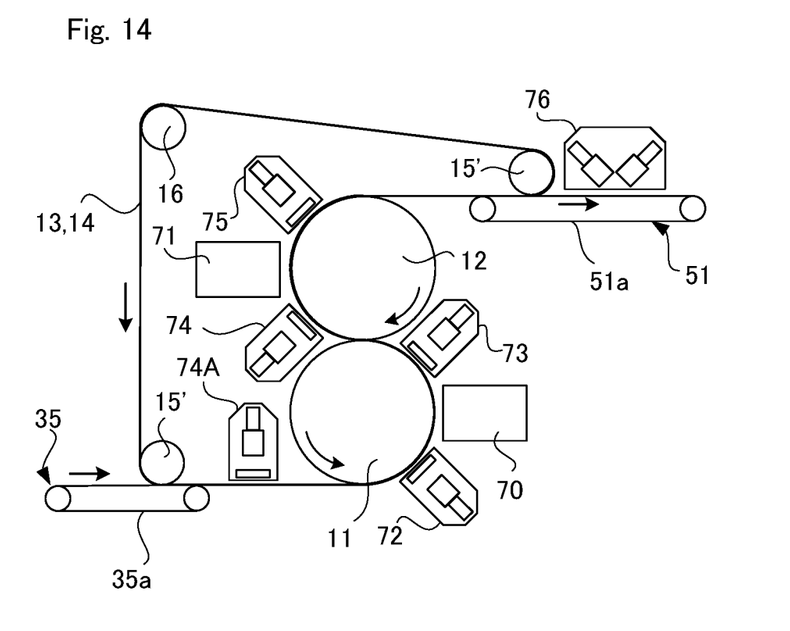
FIG. 14 is a schematic front view of a pharmaceutical formulation printing device including a pharmaceutical formulation transporting device according to another embodiment of the present invention.
Figure 15:
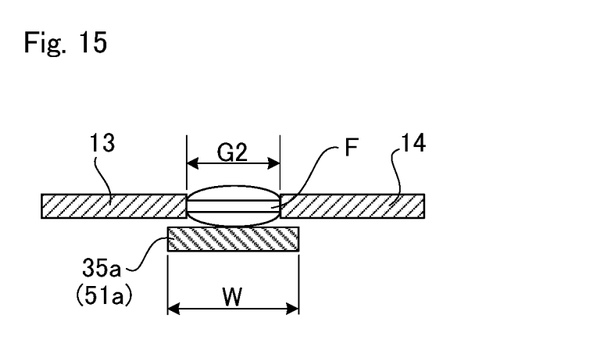
FIG. 15 is a cross-sectional view showing a principal part of the pharmaceutical formulation transporting device shown in FIG. 14.

On the other hand, the pharmaceutical formulation printing device 1 shown in FIG. 14 and FIG. 15 is configured such that both the width W of the conveyor belt 35a on the feeding side and the width W of the conveyor belt 51a on the ejecting side are greater than a maximum gap G2 that is at the largest value of the gap between the transport belts 13, 14. According to this configuration, the entirety in the width direction of the solid pharmaceutical formulation F can be supported irrespective of the type of the solid pharmaceutical formulation F, and thus the solid pharmaceutical formulation F can be reliably fed and ejected. The pharmaceutical formulation printing device 1 can also be configured such that the width W of the conveyor belt 35a on the feeding side is smaller than the minimum gap G1 between the transport belts 13, 14, and the width W of the conveyor belt 51a on the ejecting side is larger than the maximum gap G2 between the transport belts 13, 14.

In the pharmaceutical formulation printing device 1 shown in FIG. 12 and FIG. 14, the gap adjusting member 15' is not necessarily a tension pulley, and may be a component separate from the tension pulley. For example, it is possible that while the gap adjusting member 15 shown in FIG. 3 is interposed between the transport belts 13, 14 wound around the third roller 16, a plurality of the gap adjusting members 15' provided so as to correspond to the transport conveyor 35 and the ejection conveyor 51 are replaced by commonly used tension pulleys or rollers that do not function to adjust the gap between the transport belts 13, 14. In this case, providing the gap adjusting member 15 only in one place makes it possible to perform both the feeding of solid pharmaceutical formulations by the transport conveyor 35 and the ejection of the solid pharmaceutical formulations by the ejection conveyor 51, and thus the configuration can be simplified. The configuration and the placement of the gap adjusting member, roller, and tension pulley are not limited to those of the above-described embodiments, and can be suitably changed in consideration of the arrangement of the transport belts 13, 14, the layout of the printers 70, 71, and the like.

Figure 7:
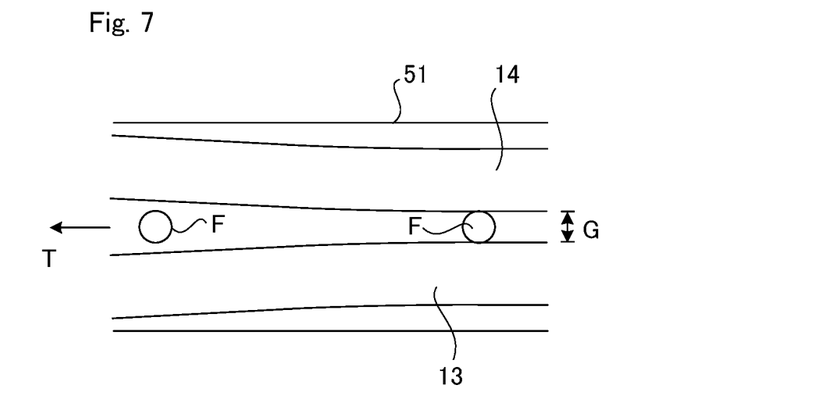
FIG. 7 is a plan view showing yet another principal part of the pharmaceutical formulation transporting device shown in FIG. 1.
Figure 11:
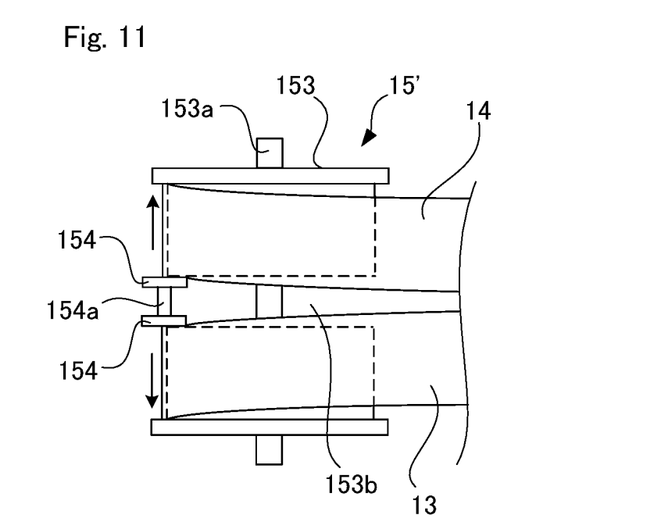
FIG. 11 is a plan view showing another modified example of a principal part of the pharmaceutical formulation transporting device shown in FIG. 8.
Figure 16:
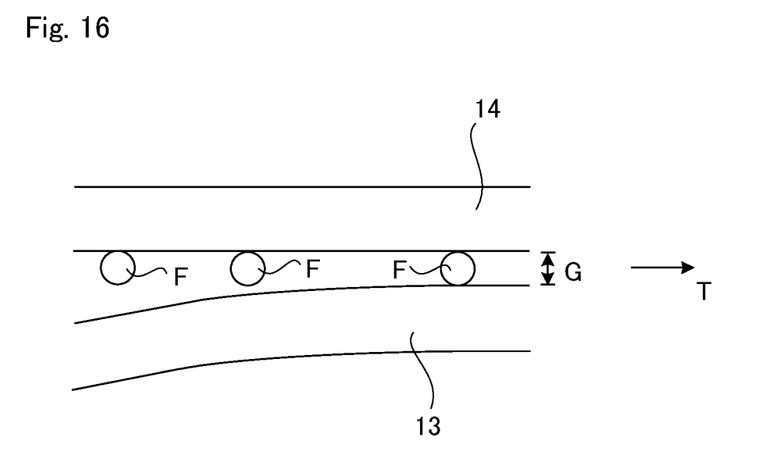
FIG. 16 is a plan view showing a principal part of the pharmaceutical formulation transporting device according to another embodiment of the present invention.
Figure 17:
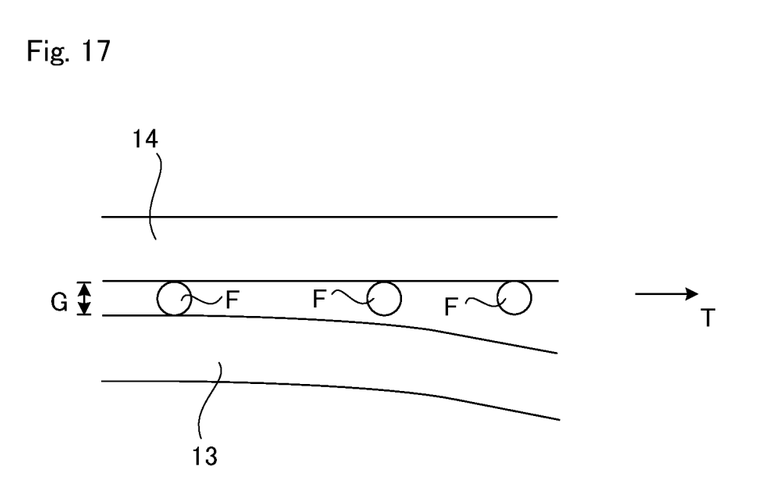
FIG. 17 is a plan view showing another principal part of the pharmaceutical formulation transporting device shown in FIG. 16.

The gap adjusting members in the above-described embodiments, such as the gap adjusting member 15 shown in FIG. 3 and the gap adjusting member 15' composed of a tension pulley shown in FIG. 9 to FIG. 11, all act for gap adjustment on both transport belts 13, 14 that hold pharmaceutical formulations and, as shown in FIG. 6 and FIG. 7, evenly shift the transport belts 13, 14 toward and away from the right and left sides of the solid pharmaceutical formulations F relative to the transporting direction T, and thus the solid pharmaceutical formulations can be reliably fed and ejected. On the other hand, it is also possible as shown in FIG. 16 and FIG. 17 that only one transport belt 13 of the transport belts 13, 14 that hold the solid pharmaceutical formulations F is shifted toward and away from one side relative to the transporting direction T to adjust the gap G between the transport belts 13, 14 without shifting the other transport belt 14. Specifically it is possible that the gap adjusting member 15 shown in FIG. 3 is engaged only with one transport belt 13 to act for gap adjustment only on one transport belt 13. Alternatively it is possible that the gap adjusting member 15' shown in FIG. 9 to FIG. 11 is caused to act for gap adjustment only on one transport belt 13 and for tension application on the other transport belt 14 as with a commonly used tension pulley. According to these configurations, the gap G between the transport belts 13, 14 can be easily adjusted only by one transport belt 13.

Figure 18:
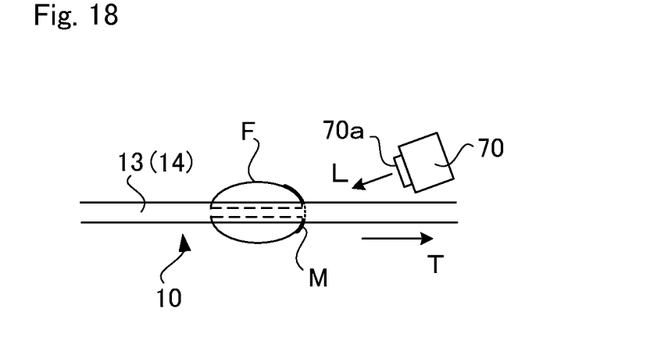
FIG. 18 is a schematic front view showing a principal part of a pharmaceutical formulation printing device according to another embodiment of the present invention.

The pharmaceutical formulation printing device 1 of each of the above-described embodiments includes a plurality of printers 70, 71 that are configured to print on the front and back of solid pharmaceutical formulations, respectively. But, as shown in FIG. 18, an irradiation part 70a of the printer 70 composed of a laser printer may be disposed such that a laser beam L is emitted in an oblique direction relative to the transporting direction T of the pharmaceutical formulation transporting device 10. According to this configuration, printing can be performed by irradiating the solid pharmaceutical formulation F with the laser beam L through the gap between the transport belts 13, 14 of the pharmaceutical formulation transporting device 10, thus a marking M can be formed on the front and back of the solid pharmaceutical formulation F by one printer 70, and the configuration can be simplified.

It is sufficient that the printer 70 is disposed so as to be capable of printing on the solid pharmaceutical formulation F through the gap between the transport belts 13, 14. Instead of causing the irradiation direction of the laser beam L to be oblique relative to the transporting direction T, the laser beam L can also be emitted in the transporting direction T. For example, when printing on the solid pharmaceutical formulation F during transport by the second pulley 12 shown in FIG. 1 or the like, the printer 70 can be disposed so as to emit the laser beam L in the tangential direction of the second pulley 12. The printer 70 may be another printer such as an inkjet printer.

Figure 19:
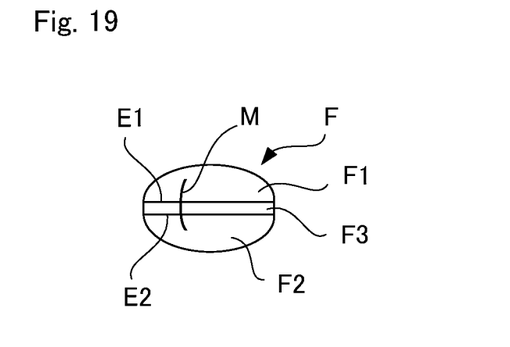
FIG. 19 is a side view showing one example of a solid pharmaceutical formulation printed on by the pharmaceutical formulation printing device shown in FIG. 18.

Thus, disposing the printer 70 so as to be capable of printing on the solid pharmaceutical formulation F through the gap between the transport belts 13, 14 makes it possible to form a print that is continuous on the front and back of the solid pharmaceutical formulation F. FIG. 19 shows an example of the solid pharmaceutical formulation F having a print that is continuous on the front and back, wherein a linear marking M that continues from a front surface F1 through a side surface F3 to a back surface F2 is formed on a tablet having the side surface F3 that is interposed between the front surface F1 and the back surface F2 via edges E1 and E2. It is difficult to form such a marking M by continuous printing when the solid pharmaceutical formulation is transported by a conventional belt transport system, and joining partially printed markings likely results in a marking that discontinues especially at the edges E1 and E2. Therefore, it is effective as a counterfeit-drug preventive measure.

REFERENCE SIGNS LIST

1 Pharmaceutical formulation printing device
10 Pharmaceutical formulation transporting device
11 First pulley
12 Second pulley
12b Retaining part
12c Supporting part
12d Space
13, 14 Transport belt
15, 15' Gap adjusting member
30 Feeding device
35 Transport conveyor
35a Conveyor belt
70, 71 Printer
110, 120 Guiding device
111, 121 Guiding member
112, 122 First sliding belt
113, 123 Second sliding belt
F Solid pharmaceutical formulation

The invention claimed is:

1. A pharmaceutical formulation transporting device comprising a first pulley, a second pulley, and a plurality of endless transport belts wound around the first pulley and the second pulley, wherein
the plurality of transport belts are disposed to be adjacent each other with a gap along rotational axes of the first pulley and the second pulley, so as to be capable of holding a solid pharmaceutical formulation at the gap which is formed between respective first side surfaces.

2. The pharmaceutical formulation transporting device according to claim 1, wherein at least either of the first pulley and the second pulley has a space for accommodating the held solid pharmaceutical formulation between a plurality of supporting parts around which the plurality of transport belts are respectively wound.

3. The pharmaceutical formulation transporting device according to claim 2, further comprising retaining parts, wherein the retaining parts are connected to the supporting parts and retain second side surfaces of the transport belts.

4. The pharmaceutical formulation transporting device according to claim 1, further comprising guiding means, wherein the guiding means are disposed between the first pulley and the second pulley and guide the transport belts.

5. A pharmaceutical formulation printing device comprising the pharmaceutical formulation transporting device according to claim 1 and a plurality of printers for respectively printing on a front and back of a solid pharmaceutical formulation transported by the plurality of transport belts of the pharmaceutical formulation transporting device.

6. The pharmaceutical formulation printing device according to claim 5, further comprising a plurality of pre-printing inspecting devices for inspecting the front and back of the solid pharmaceutical formulation before printing, wherein
the plurality of pre-printing inspecting devices are disposed on an upstream side of any of the plurality of printers in a transporting direction.

7. The pharmaceutical formulation printing device according to claim 5, wherein
the plurality of transport belts are wound around a plurality of pulleys including the first pulley and the second pulley, and
the plurality of printers are each disposed so as to print the solid pharmaceutical formulation transported between any two adjacent pulleys.

8. The pharmaceutical formulation printing device according to claim 5, wherein
the plurality of transport belts are wound around a plurality of pulleys including the first pulley and the second pulley, and
the plurality of printers are each disposed so as to perform printing during transportation of the solid pharmaceutical formulation by any of the plurality of pulleys.

9. A pharmaceutical formulation printing device comprising the pharmaceutical formulation transporting device according to claim 1 and a printer for printing a solid pharmaceutical formulation transported by the plurality of transport belts of the pharmaceutical formulation transporting device, wherein
the printer is disposed so as to be capable of printing on the solid pharmaceutical formulation through a gap between the plurality of transport belts.

10. A solid pharmaceutical formulation having a print provided by the pharmaceutical formulation printing device according to claim 9, wherein the print is continuous on a front and back.

11. The pharmaceutical formulation transporting device according to claim 1, wherein
the plurality of endless transport belts includes at least a pair of transport belts that are first and second transport belts, each of which is shaped with outer and inner surfaces and a pair of side surfaces wherein the outer and inner surfaces define a width of the endless transport belt, and the pair of side surfaces, which are sandwiched between the outer and inner surfaces, define a thickness of the endless transport belt,
the first side surfaces are one of the side surfaces of the first and second transport belts, and the first side surfaces are arranged to face each other and to be distant with the gap.

12. The pharmaceutical formulation transporting device according to claim 11, wherein
the rotational axes of the first pulley and the second pulley are arranged parallel at a same height such that the gap formed between the first side surfaces is maintained while the first and second transport belts rotate around the first and second pulleys.

13. A pharmaceutical formulation transporting device comprising a first pulley, a second pulley, and a plurality of endless transport belts wound around the first pulley and the second pulley, wherein
the plurality of transport belts are disposed so as to be capable of holding a solid pharmaceutical formulation between respective first side surfaces,
the pharmaceutical formulation transporting device further comprises guiding means, wherein the guiding means are disposed between the first pulley and the second pulley and guide the transport belts,
the guiding means comprise guiding members having notched channels, and a first sliding belt and a second sliding belt for sliding along bottom surfaces and side surfaces of the respective channels, and
the transport belts are in contact with the first sliding belt and the second sliding belt and are integrally transported.

14. A pharmaceutical formulation transporting device comprising a first pulley, a second pulley, and a plurality of endless transport belts wound around the first pulley and the second pulley, wherein
the plurality of transport belts are disposed so as to be capable of holding solid pharmaceutical formulation between respective first side surfaces,
a feeding means for feeding the solid pharmaceutical formulation to a space between the plurality of transport belts, and
a gap adjusting member for increasing a gap between the transport belts on a further upstream side in a transporting direction of the transport belts than a place where the solid pharmaceutical formulation is fed by the feeding means.

15. The pharmaceutical formulation transporting device according to claim 14, wherein the gap adjusting member comprises a tension pulley for applying tension to the transport belts.

16. The pharmaceutical formulation transporting device according to claim 14, wherein the gap adjusting member acts for gap adjustment on both of the transport belts for holding the solid pharmaceutical formulation.

17. The pharmaceutical formulation transporting device according to claim 14, wherein the gap adjusting member acts for gap adjustment on only one of the transport belts for holding the solid pharmaceutical formulation.

18. The pharmaceutical formulation transporting device according to claim 14, wherein
the gap between the transport belts in a solid pharmaceutical formulation holding state is configured to be variable within a predetermined range,
the feeding means comprises a conveyor belt for transporting the solid pharmaceutical formulation, and
a width of the conveyor belt is smaller than a minimum gap between the transport belts.

19. The pharmaceutical formulation transporting device according to claim 14, wherein
the gap between the transport belts in a solid pharmaceutical formulation holding state is configured to be variable within a predetermined range,
the feeding means comprises a conveyor belt for transporting the solid pharmaceutical formulation, and
a width of the conveyor belt is larger than a maximum gap between the plurality of transport belts.

* * * * *